(12) United States Patent
Finkelstein et al.

(10) Patent No.: US 8,196,046 B2
(45) Date of Patent: Jun. 5, 2012

(54) PARALLEL VISUAL RADIO STATION SELECTION

(75) Inventors: Barbara Finkelstein, Riverdale, NY (US); Itzhack Goldberg, Hadera (IL); Ron Hoory, Haifa (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 12/184,945

(22) Filed: Aug. 1, 2008

(65) Prior Publication Data

US 2010/0031146 A1 Feb. 4, 2010

(51) Int. Cl.
*G06F 3/16* (2006.01)
(52) U.S. Cl. ........................................ 715/727
(58) Field of Classification Search ............... 715/721, 715/727, 728, 738, 763, 772, 810, 835, 846
See application file for complete search history.

(56) References Cited

U.S. PATENT DOCUMENTS

| | | | |
|---|---|---|---|
| 6,496,687 B1 | 12/2002 | Switlyk | |
| 2001/0053944 A1 | 12/2001 | Marks et al. | |
| 2002/0057380 A1 | 5/2002 | Matey | |
| 2003/0023975 A1* | 1/2003 | Schrader et al. | 725/51 |
| 2004/0176061 A1 | 9/2004 | Zehnle et al. | |
| 2005/0108754 A1 | 5/2005 | Carhart et al. | |
| 2005/0148296 A1 | 7/2005 | Kopra et al. | |
| 2005/0165789 A1* | 7/2005 | Minton et al. | 707/10 |
| 2006/0019642 A1 | 1/2006 | Steelberg et al. | |
| 2006/0184960 A1* | 8/2006 | Horton et al. | 725/25 |
| 2007/0143777 A1 | 6/2007 | Wang | |
| 2007/0196802 A1 | 8/2007 | Beletski et al. | |
| 2008/0245215 A1* | 10/2008 | Kobayashi | 84/661 |
| 2009/0043721 A1* | 2/2009 | Reznik et al. | 706/20 |
| 2009/0177299 A1* | 7/2009 | Van De Sluis et al. | 700/94 |

OTHER PUBLICATIONS

Wasenius, "Visual Radio Parallel Channel", Nokia, Apr. 29, 2004, pp. 1-15 www.visualradio.com.

* cited by examiner

*Primary Examiner* — Thanh Vu
(74) *Attorney, Agent, or Firm* — Yee & Associates, P.C.; Derek S. Jennings (57) ABSTRACT

A computer implemented method in a data processing system and a computer program product enable visual selection of a media signal. A set of media signals is received from a set of media providers. A subject matter and a performer of the subject matter are then identified for at least one of the set of media signals. A set of icons is then identified. Each of the set of icons corresponds to at least one of media signals. The set of icons and the set of media providers are then forwarded to a client media player.

22 Claims, 6 Drawing Sheets

PARALLEL VISUAL RADIO STATION SELECTION

BACKGROUND OF THE INVENTION

1. Field of the Invention

The present invention relates generally to computer implemented methods in a data processing system and computer program products. More specifically, the present invention relates to computer implemented methods in a data processing system and computer program products for enabling visual selection of a media signal.

2. Description of the Related Art

People are inundated with a multitude of media options, and selecting content from those options is typically done on a haphazard, trial-and-error basis. When listening to a radio, a user is generally relegated to manually scanning each station to determine whether the content on that station is desirable. The advent of digital radio and satellite radio only compound this problem by exponentially increasing the number of available media signals and providers.

When watching television, one can manually scan the available channels, or can rely on a text description, of the available programming. Cable, satellite, and other providers of television services again only increase the amount of time spent in attempting to find satisfactory programming.

Internet sites are also implementing more streaming content. With Internet sites more frequently hosting live events and live broadcasting of streaming data, there is no easy visual method for a user to determine the current content for that streaming data. A user must load content for each site in a separate browser, or must sequentially visit a multitude of sites in order to find desired programming.

SUMMARY OF THE INVENTION

A computer implemented method in a data processing system and a computer program product are provided for enabling visual selection of a media signal. A set of media signals is received from a set of media providers. A subject matter and a performer of the subject matter are then identified for at least one of the set of media signals. A set of icons is then identified. Each of the set of icons corresponds to at least one of media signals. The set of icons and the set of media providers are then forwarded to a client media player.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
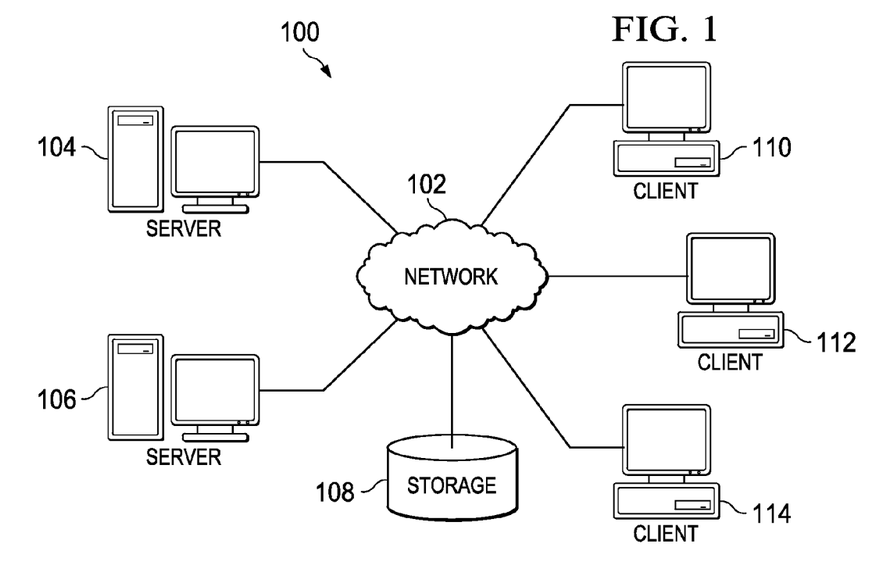
FIG. 1 is a pictorial representation of a network of data processing systems in which illustrative embodiments may be implemented.
Figure 2:
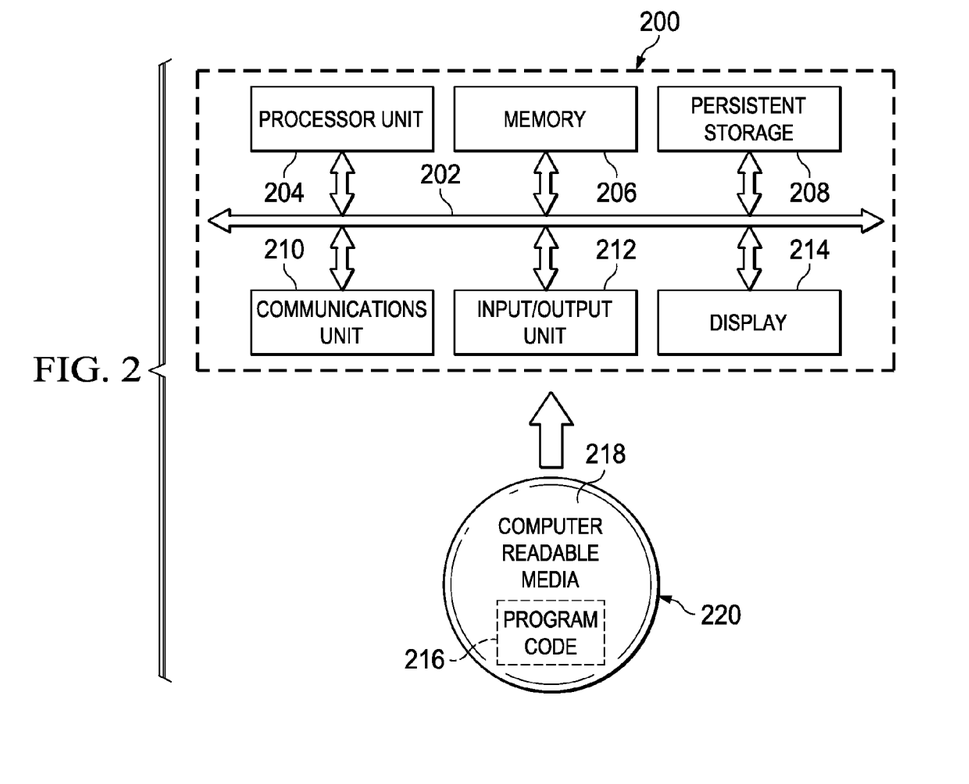
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as is found in an interface and memory controller hub that may be present in communications fabric 202.

The illustrative embodiments describe a computer implemented method in a data processing system, and a computer program product for visually selecting a media signal. A set of media signals is received from a set of media providers. A set of characteristics is then identified for at least one of the set of media signals. A composite icon is then generated from the set of characteristics for at least one of the set of media signals. The composite icon and the set of media providers are then forwarded to a client media player.

Figure 3:
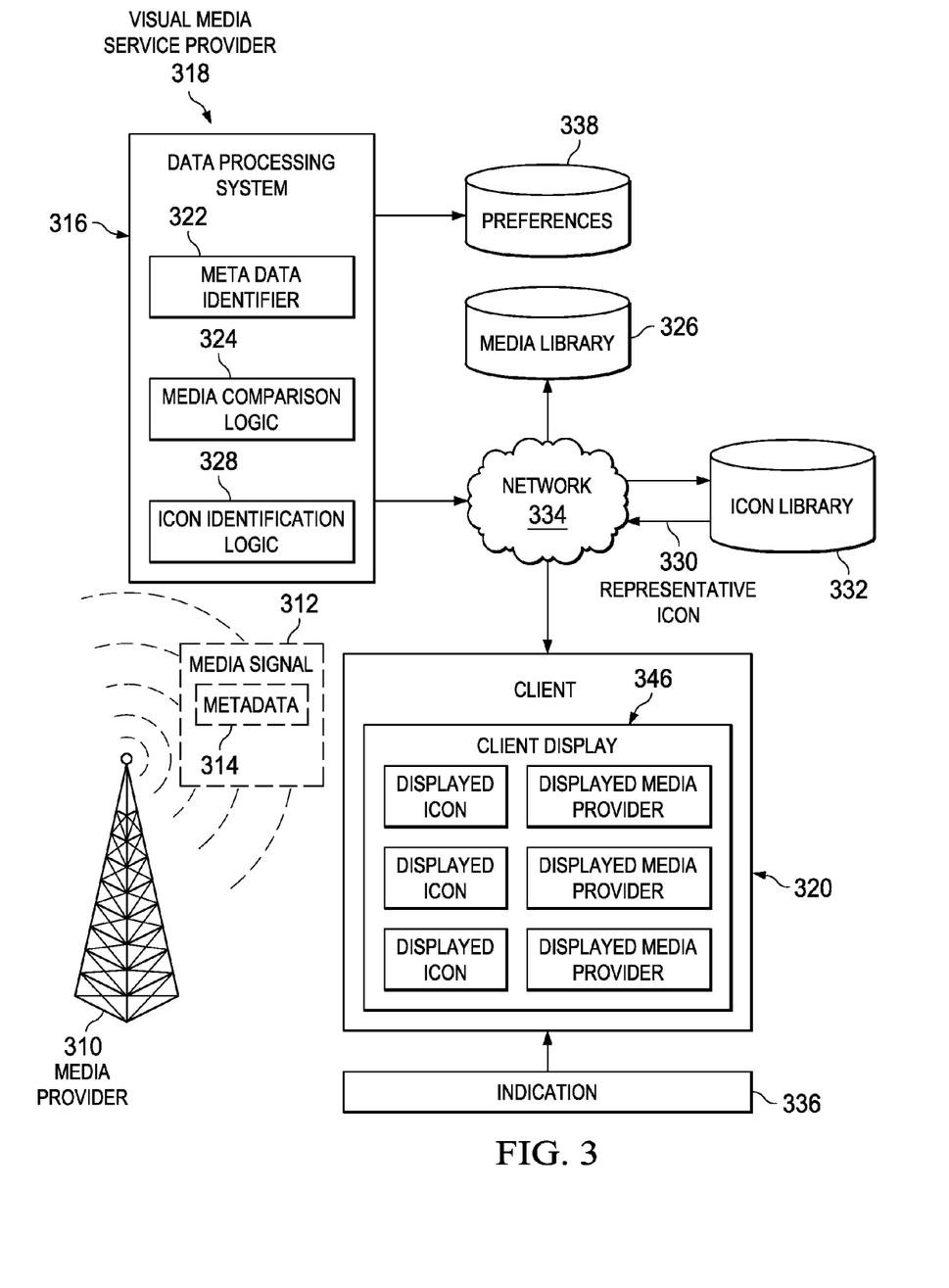
FIG. 3 is a block diagram of data flow between the various components in accordance with an illustrative embodiment.

Referring now to FIG. 3, a block diagram of data flow between the various components is shown in accordance with an illustrative embodiment.

Media provider 310 transmits media signal 312. Media provider 310 is a provider of any type such as, audio, visual, or electronic media, including for example, but not limited to, a television broadcast, a radio broadcast, a satellite transmission, and transmissions through cable or optical connections. Media provider 310 can also be the provider of an electronic data transmission, such as a live or streaming data transmission over a network from a network site. Media signal 312 is the signal that is transmitted by media provider 310. In one illustrative embodiment, media signal 312 is a radio broadcast, and media provider 310 is the broadcaster of media signal 312.

Media signal 312 can optionally contain metadata 314. Metadata 314 is visual media service provider 318, which is a data processing system for delivering visual indicators to a client for selection of a specific media signal. Visual media service provider 318 is a data processing system, such as server 104 and server 106 of FIG. 1.

Data processing system 316 at visual media service provider 318 is a data processing system, such as server 104 and server 106 of FIG. 1. Data processing system 316 runs software applications to identify subject matter and a performer of that subject matter for media signal 312. Visual media service provider 318 is a service that provides a visual indication of media signal 312 to client 320.

Data processing system 316 receives media signal 312 from media provider 310. Metadata identifier 322 is a software system executing on data processing system 316 that checks for metadata 314 that may be included with media signal 312. In one illustrative example, metadata 314 can be digital video broadcasting service information (DVB-SI) that includes information about media signal 312, including the identity of the subject matter and the identity of the performer of that subject matter. As used herein, "subject matter" is an identification of the content of the media signal, such as a song or album title, a movie title, identity of a sporting event or other live event, and the like. The performer is the person performing the subject matter. For example, in the case of a song or musical composition, the performer may be the composer of the composition, or the musicians performing the composition. In the case of a talk show, the performer may include the moderator of the talk show as well as the participants in the forum. In the case of a sporting event, the performer can include the athletes or teams participating in the sporting event.

Media comparison logic 324 is a software system executing on data processing system 316 that, in the event that media signal 312 lacks metadata 314, compares media signal 312 to reference signals in media library 326. Media library 326 is a data storage containing reference signals. If media signal 312 lacks metadata 314, media comparison logic 324 compares media signal 312 to reference signals stored in media library 326. Each reference signal has an associated subject matter and performer. If media signal 312 is found to match one of the reference signals, then the subject matter and performer associated with the reference signal is utilized as the subject matter and performer of media signal 312.

For those media signals 312 that do not match a reference signal stored in media library, media comparison logic 324 can perform a statistical comparison of the media signal to a statistical database in order to determine a probable subject matter and a probable performer. Media comparison logic 324 extracts various parameters from media signal 312. Media signal 312 is typically divided to frames, and each frame undergoes a short-time Fourier transformation, or other digital transformation, to create a spectral representation of media signal 312. Characteristics of the transformed media signal are isolated from each of the transformed media signal frames, and compared to statistical models of known subject matter and performers to determine similarities using known statistical classification methods, such as K-nearest neighbor, Gaussian mixture modeling, support vector machines, vector quantization, hidden Markov modeling, and multivariate auto-regression modeling. A probable subject matter and probable performer can then be determined.

In one illustrative embodiment, other features of the subject matter, such as a speaker's emotional state, background features of the media signal—such as applause—can also be extracted from the media signal and incorporated into the subject matter. Speech recognition can be used to convert voice to text and then applying text analysis and topic detection methods known in the art to identify the subject matter.

In one illustrative embodiment, media comparison logic 324 can access information regarding media signal 312 from a network informational database. When media provider 310 is known, media comparison logic 324 can retrieve a schedule of known programming from a network informational database of the media provider. The performer and the subject matter of media signal 312 are then determined with the assistance of a network informational database of the known media provider 310. This can be done either explicitly, if detailed information is available, or implicitly by narrowing down the comparison domain of the media comparison logic.

Icon identification logic 328 is a software system executing on data processing system 316 that identifies a visual indicator to represent the subject matter and performer of media signal 312. Icon identification logic 328 receives the subject matter and performer of media signal 312 from either metadata identifier 322 or media comparison logic 324. Icon identification logic 328 then identifies representative icon 330 in icon library 332 that corresponds to the known subject matter and performer of media signal 312.

In one illustrative embodiment, representative icon 330 is a combination of the corresponding icon within icon library 332, and the performer of media signal 312. Thus, the representative icon would be an amalgamation of the performer, and the visual representation of media signal 312 as identified from media library 326.

Once representative icon 330 is determined, data processing system 316 forwards representative icon 330, as well as an identity of media provider 310 through network 334 to client 320. Network 334 is a network such as network 102 of FIG. 1. Client 320 is a client, such as clients 110, 112, and 114, of FIG. 1. In one illustrative embodiment, client 320 is a web enabled radio, capable of playing signals received from a media provider, such as media provider 310.

Client 320 includes client display 346. Client display 346 is a visual display capable of displaying representative icon 330 to a user of client 320. Client display 346 can utilize any known display technology, including for example, but not limited to, liquid crystal, cathode ray tube, plasma, liquid crystal on silicon, and digital light processing.

Client 320 receives representative icon 330, as well as an identity of media provider 310 from data processing system 316. Client 320 then displays representative icon 330 in conjunction with the identity of media provider 310 on client display 346.

Client 320 receives indication 336 from a user. Indication 336 is an input from the user indicating that the user would like to receive media signal 312 represented by representative icon 330. Indication 336 can be received from a "click" of the icon, either from a separate selection device, such as a mouse or remote control, or from touching the icon, if client display 346 is a touch sensitive display.

When client 320 receives indication 336 from the user, client 320 plays media signal 312 from media provider 310. Client 320 can play media signal 312 by receiving media signal 312 directly from media provider 310. Alternatively, client 320 could also play media signal 312 by receiving media signal 312 forwarded from data processing system 316. In one illustrative embodiment, client 320 receives a radio signal directly from media provider 310.

In one illustrative embodiment, a user can indicate preferred media signals, preferred performer, preferred subject matter, or preferred media providers, to be stored in preferences 338. Preferences 338 is a storage containing indications of which media providers, such as media provider 310, a user of a client, such as client 320, has indicated as being a preferred signal. When data processing system 316 receives media signal 312, media signal 312 is first compared to the preferred signals stored in preferences 338. If media signal 312 is not identified in preferences 338, its performer and subject matter are identified. If they do not match preferences 338 as well, data processing system 316 can prevent representative icon 330 for that media signal from being sent to client 320.

In another illustrative embodiment, preferences 338 can be a local storage at client 320. Responsive to receiving representative icon 330, and the identity of media provider 310, a software component on client 320 can determine whether media provider 310 is a preferred provider. If media provider 310 is not identified in preferences 338, client 320 would not display representative icon 330 for media signal 312 on client display 346.

It is appreciated that data processing system 316 can receive a plurality of media signals from different media providers. Data processing system 316 would then retrieve a different representative icon for each of the media signals. Client 320 could then display a plurality of representative icons, such as representative icon 330, each of the representative icons corresponding to a different media signal.

Figure 4:
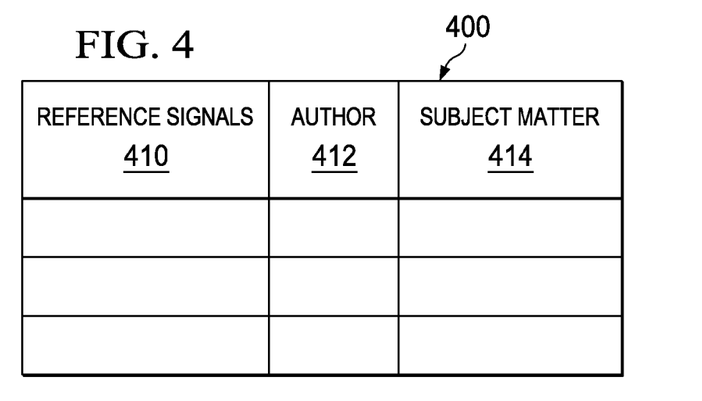
FIG. 4 is a data structure containing reference signals according to an illustrative embodiment.

Referring now to FIG. 4, a data structure containing reference signals is shown according to an illustrative embodiment. Data structure 400 can be a data structure within media library 326 of FIG. 3.

Reference signals 410 are exemplary signals to which a media signal, such as media signal 312 of FIG. 3, can be compared. Reference signal 410 can be a wave file, a byte stream, or any other stored representation of a media signal.

Associated with each of reference signals 410 are a performer 412 and a subject matter 414. A data processing system, such as data processing system 316 of FIG. 3, accesses data structure 400 to determine one of reference signals 410 that matches a media signal received by the data processing system, such as media signal 312 of FIG. 3.

Data structure 400 can be any known data structure, including for example, but not limited to, an array, a lookup table, a linked list, a Vlist, a line, a hash table, a tree, and a heap.

Figure 5:
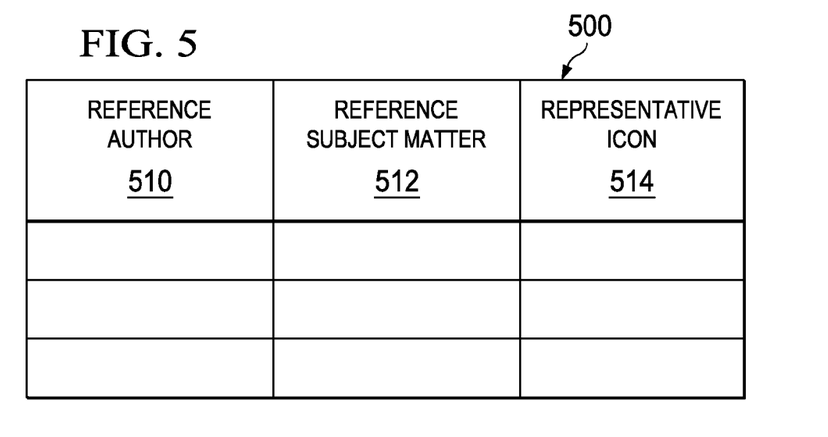
FIG. 5 is a data structure containing reference icons according to an illustrative embodiment.

Referring now to FIG. 5, a data structure containing reference icons is shown according to an illustrative embodiment. Data structure 500 can be a data structure within icon library 332 of FIG. 3.

Performers and subject matter identified from either metadata, such as metadata 314 of FIG. 3, or from a media library, such as media library 326 of FIG. 3, are compared to reference performers 510 and reference subject matter 512 to determine representative icon 514.

Associated with reference performers 510 and reference subject matter 512 is one of representative icons 514, such as representative icon 330 of FIG. 3. A data processing system, such as data processing system 316 of FIG. 3 accesses data structure 500 to identify one of representative icons 514, which corresponds to a performer or subject matter identified from either metadata, such as metadata 314 of FIG. 3, or from a media library, such as media library 326 of FIG. 3.

Data structure 500 can be any known data structure, including for example, but not limited to, an array, a lookup table, a linked list, a Vlist, a line, a hash table, a tree, and a heap.

Figure 6:
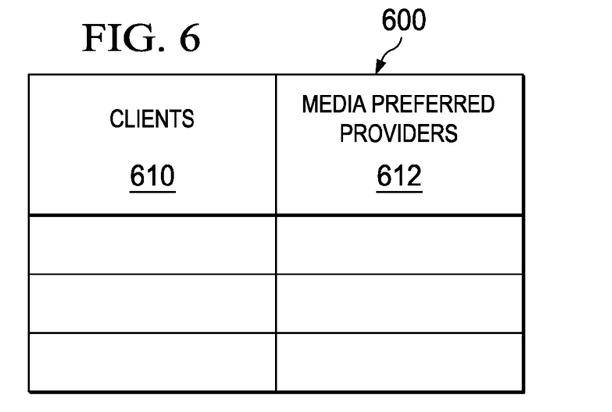
FIG. 6 is a data structure containing preferred media providers for a client according to an illustrative embodiment.

Referring now to FIG. 6, a data structure containing preferred media providers for a client is shown according to an illustrative embodiment. Data structure 600 can be a data structure within preferences 338 of FIG. 3.

A list of preferred media providers is associated with clients 610, which can be client 320 of FIG. 3. A media provider, such as media provider 310 of FIG. 3, is a preferred media provider if a user of client 320 of FIG. 3 designates the media provider as such. A user can designate a media provider as a preferred media provider by any means known in the art.

When a data processing system, such as data processing system 316 of FIG. 3, receives media signal, the provider of that media signal is compared to preferred media providers 612 of data structure 600. If the provider of the received media signal is not one of preferred media providers 612, the data processing system can prevent a representative icon for that media signal from being sent to a client. Preferred media providers 612 can be stored and indexed as, for example but not limited to, radio frequencies, television frequencies, uniform resource locator addresses, domain names, or other unique identifiers of the media provider.

Figure 7:
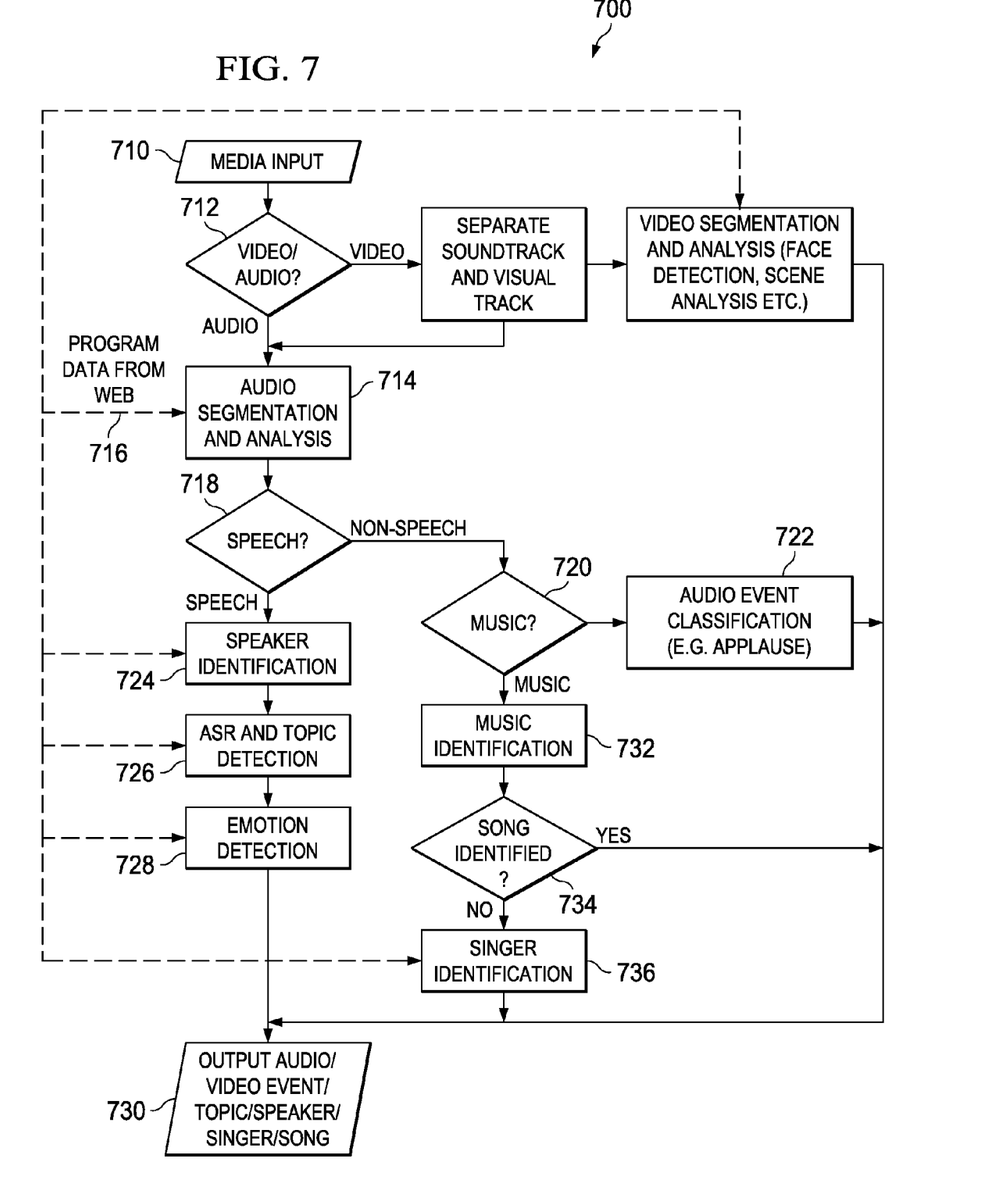
FIG. 7 is a flowchart showing the processing steps for determining a set of characteristics of media signals according to an illustrative embodiment.

Referring now to FIG. 7, a flowchart showing the processing steps for determining a set of characteristics of media signals is shown according to an illustrative embodiment. Process 700 is a software process executing on the various software components of a data processing system, such as data processing system 316 of FIG. 3.

Process 700 begins by receiving a media signal from a media provider (step 710). The media provider, which can be media provider 310 of FIG. 3, is a provider of any type such as, audio, visual, or electronic media, including for example, but not limited to, a television broadcast, a radio broadcast, a satellite transmission, and transmissions through cable or optical connections. The media provider can also be the provider of an electronic data transmission, such as a live or streaming data transmission over a network from a network site. The media signal, which can be media signal 312 of FIG. 3, is the signal that is transmitted by the media provider.

Responsive to receiving the media signal, process 700 then identifies whether the media signal is an audio signal, or a video signal (step 712). Alternatively, process 700 can identify that the media signal is comprised of both an audio signal and a video signal. Under such circumstances, process 700 would identify the signal as containing both an audio signal ("audio" at step 712) and a video signal ("video" at step 712). In one illustrative embodiment, a media file comprised of both an audio signal and a video signal could be separated into its component audio and video signals.

Responsive to determining that the media signal is an audio signal ("audio" at step 712), process 700 begins audio segmentation and analysis on the media signal with (step 714). Process 700 can additionally retrieve program data from the media provider, or other location regarding the content of the media signal (step 716). Process 700 can access information regarding the media signal from a network informational database. When the media provider is known, a schedule of known programming from a network informational database can be retrieved for the media provider. The performer and the subject matter of media signal can then be determined from a network informational database of the known media provider.

Audio segmentation and analysis can include the plurality of steps of process 700 determining whether the media signal is speech (step 718), music (step 720), or a non-verbal audio event (step 722). A non-verbal audio event, can include, but is not limited to, applause, cheering, booing, or other enunciated, or non-enunciated noises that are not classified as speech or music.

For each of steps 718-728, process 700 extracts various parameters from the media signal. The media comparison logic extracts various parameters from the media signal. The media signal is typically divided to frames, and each frame undergoes a short-time Fourier transformation, or other digital transformation, to create a spectral representation of the media signal. Characteristics of the transformed media signal are isolated from each of the transformed media signal frames, and compared to statistical models of known subject matter and performers to determine similarities using known statistical classification methods, such as K-nearest neighbor, Gaussian mixture modeling, support vector machines, vector quantization, hidden Markov modeling, and multivariate auto-regression modeling. A probable subject matter and probable performer can then be determined.

Using these known modeling and comparison methods, process 700 classifies the media stream as speech, music, or a non-verbal audio event. A non-verbal audio event is a "catch all" classification of the media signal, wherein the media signal was classified as non-speech ("non-speech" at step 718), and non-music ("non-music" at step 720).

Returning now to step 718, responsive to process 700 identifying the media signal as speech ("speech" at step 718), process 700 identifies the speaker of media signal (step 724). The speaker of the media signal can be the performer of media signal 312 of FIG. 3. The can also be determined from a network informational database of the known media provider.

Process 700 can also perform an automatic speech recognition and topic detection on the media signal (step 726). Topic detection can be performed by known methods mentioned above, by tracking repeated and related words and phrases. The topic can be the subject matter of media signal 312 of FIG. 3. The detection can also be determined from a network informational database of the known media provider.

Process 700 can also perform emotion detection on the received media signal (step 728). Emotion detection can be performed by known methods mentioned above, by tracking pitch and volume related features in utterances of the media signal. Emotion of can also be determined from a network informational database of the known media provider. Speech recognition textual output can be used to detect emotion as well, such as, for example, but not limited to, the detection of certain emotional words or phrases.

In one illustrative embodiment, steps 724-728 can be identified in parallel. Determination of the characteristics of the media signal could then be more rapidly determined for output to a client.

Responsive to identifying a speaker, topic, or emotion, process 700 forwards these identified characteristics of the media signal to an icon identification or generation process for output of the identified characteristics (step 730), with the process terminating thereafter. The identified characteristics can be embodied in a composite icon that can be displayed on a media device, such as client 320 of FIG. 3. The composite icon can include the speaker identification, topic identification, any identified emotion, a singer identification, a identified song title, and any other event identifying or characteristic event information relevant to the content of the received media signal.

Returning now to step 718, responsive to determining that the media signal is non-speech ("non-speech" at 718), process 700 identifies whether the media signal is music (step 720). Responsive to identifying the media signal as music ("music" at step 720), process 700 performs music identification on the media signal (step 732). Music identification can include identifying a song (step 734) that is contained in the media signal, and identifying a singer or artist (step 736) that is performing the song in the media signal. The song and the artist can be identified by known methods mentioned above, by isolating characteristics of the transformed media signal, and comparing those characteristics to known samples and statistical models of known subject matter and performers to determine similarities using known methods. The song and the artist can also be determined from a network informational database of the known media provider.

Responsive to identifying any music information, such as the song, and artist, process 700 forwards these identified characteristics of the media signal to an icon identification or generation process for output of the identified characteristics (step 730), with the process terminating thereafter.

Returning now to step 722, responsive to identifying the media signal as non-speech ("non-speech" at step 718) and non-music ("non-music" at step 720), process 700 identifies the media signal as a non-verbal audio event (step 722). A non-verbal audio event is a "catch all" classification of the media signal. The non-verbal audio event, can include, but is not limited to, applause, cheering, booing, or other enunciated, or non-enunciated noises that are not classified as speech or music. The non-verbal audio event can be identified by known methods mentioned above, by isolating characteristics of the transformed media signal, and comparing those characteristics to known samples and statistical models of to determine similarities using known methods.

Responsive to identifying any non-verbal audio event, process 700 forwards these identified characteristics of the media signal to an icon identification or generation process for output of the identified characteristics (step 730), with the process terminating thereafter. The identified characteristics can be output as a composite icon that is generated from the characteristics of media signal.

Figure 8:
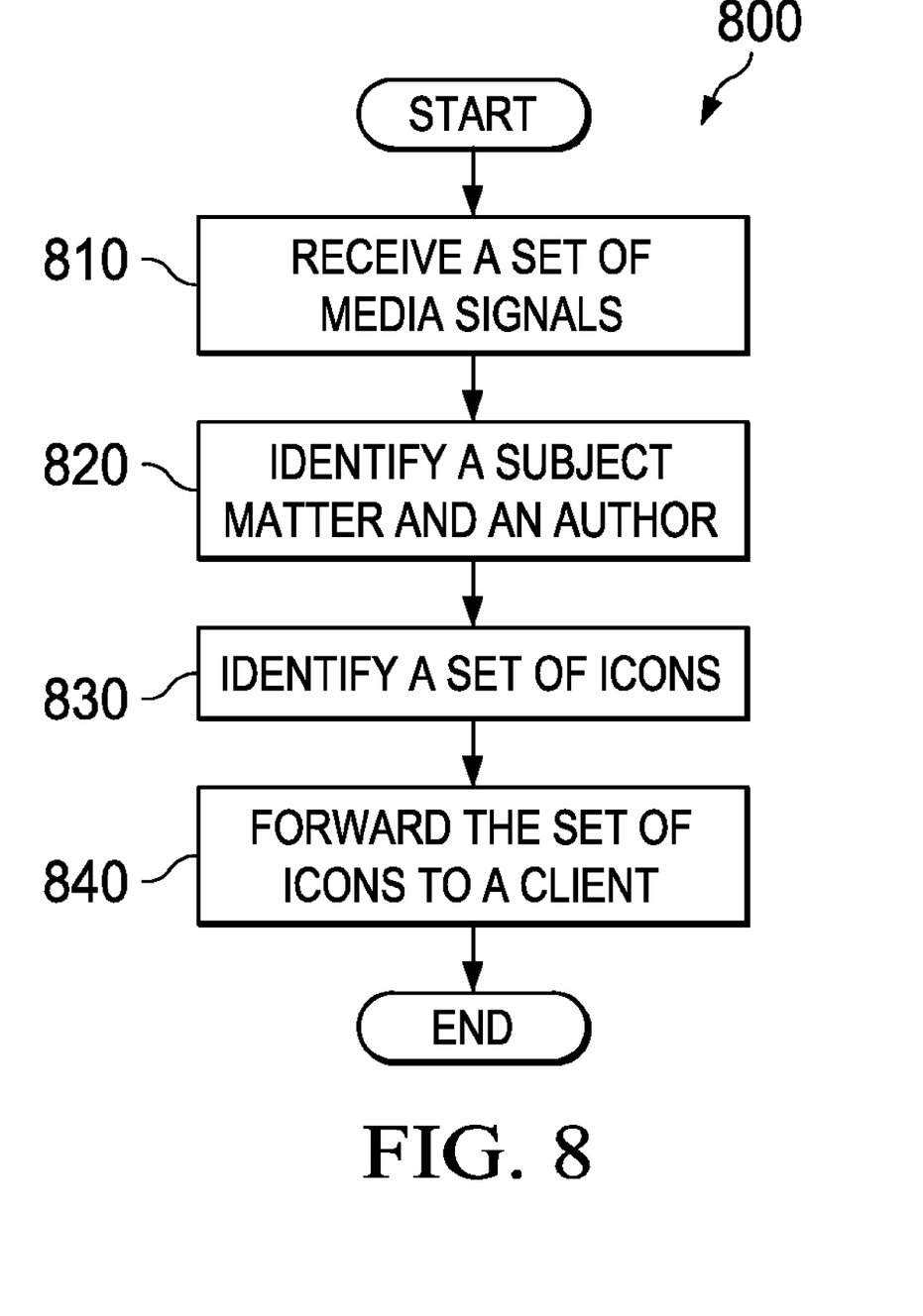
FIG. 8 is a simplified flowchart showing the processing steps for providing a parallel visual media station selection according to an illustrative embodiment.

Referring now to FIG. 8, a simplified flowchart showing the processing steps for providing a parallel visual media station selection is shown according to an illustrative embodiment. Process 800 is a software process executing on the various software components of a data processing system, such as data processing system 316 of FIG. 3.

Process 800 begins by receiving a set of media signals (step 810), such as media signal 312 of FIG. 3, from a media provider, such as media provider 310 of FIG. 3. The media signal is transmitted by the media provider. In one illustrative embodiment, media signal 312 of FIG. 3 is a radio broadcast, and media provider 310 is the broadcaster of media signal 312 of FIG. 3.

Responsive to receiving the set of media signals, process 800 identifies a subject matter and a performer (step 820). A software component, such as metadata identifier 322 of FIG. 3, checks for metadata that may be included with the media signal. The metadata can include information about the media signal, including the subject matter and the identity of the performer of that subject matter. If the media signal lacks metadata, a software component, such as media comparison logic 324 of FIG. 3, can compare the media signal to reference signals stored in a media library, such as media library 326 of FIG. 3. If the media signal is found to match one of the reference signals, then the subject matter and performer associated with the reference signal is utilized as the subject matter and performer of the media signal. Otherwise, statistical methods may be applied to identify the performer and subject matter.

Responsive to identifying the performer and subject matter of the media signal, process 800 identifies a set of icons (step 830). A software component, such as icon identification logic 328 of FIG. 3, identifies a visual indicator to represent the subject matter and performer for each of the set of received media signals. The software component receives the identified subject matter and performer of the media signal. The software component then identifies a representative icon in an icon library that corresponds to the known subject matter and performer of the media signal.

Responsive to identifying the icons, process 800 forwards the set of icons to a client (step 840), with the process terminating thereafter.

Figure 9:
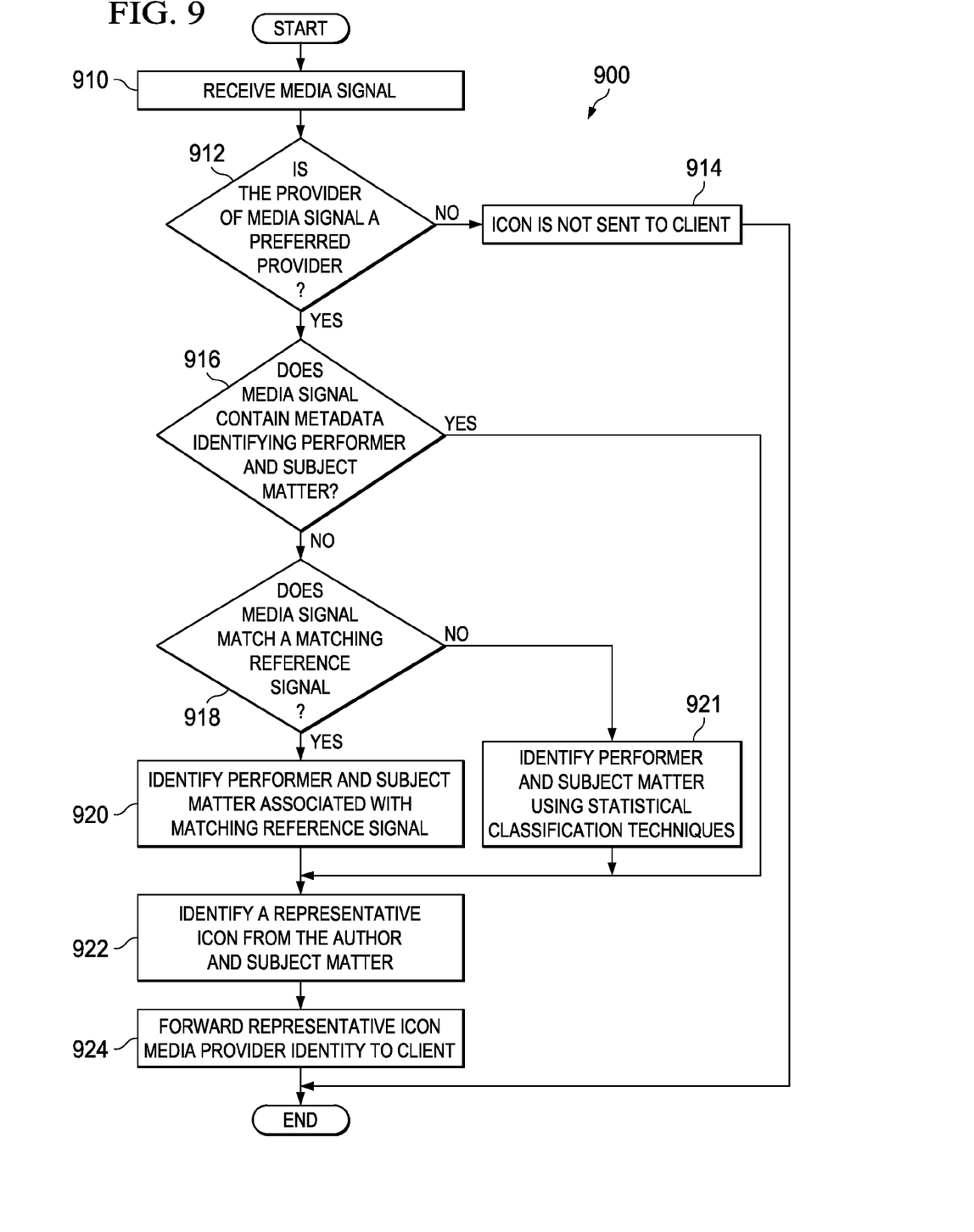
FIG. 9 is a detailed flowchart showing the processing steps for providing a parallel visual media station selection according to an illustrative embodiment.

Referring now to FIG. 9, a detailed flowchart showing the processing steps for providing a parallel visual media station selection is shown according to an illustrative embodiment.

Process 900 is a software process executing on the various software components of a data processing system, such as data processing system 316 of FIG. 3. Process 900 is a more detailed depiction of process 800 of FIG. 8.

Process 900 begins by receiving a media signal (step 910), such as media signal 312 of FIG. 3, from a media provider, such as media provider 310 of FIG. 3. The media signal is transmitted by the media provider. In one illustrative embodiment, media signal 312 of FIG. 3 is a radio broadcast, and media provider 310 is the broadcaster of media signal 312 of FIG. 3.

Responsive to receiving the media signal, process 900 identifies whether the provider of the media signal is a preferred provider (step 912). A user can indicate preferred media signals, or preferred media providers, to be stored in a storage, such as preferences 338 of FIG. 3. The Received media signals are compared to the preferred signals stored in the storage. Preferred media providers can be stored and indexed as, for example but not limited to, radio frequencies, television frequencies, uniform resource locator addresses, domain names, or other unique identifiers of the media provider.

Responsive to process 900 not identifying that the provider of the media signal as a preferred provider ("no" at step 912), process 900 does not send an representative icon for that media signal to the client (step 914), with the process terminating thereafter. Because the provider of the media signal was not identified from the preferred providers, the client has inherently chosen not to receive a visual indication of the content of the received media signal.

Responsive to process 900 identifying that the provider of the media signal is a preferred provider ("yes" at step 912), process 900 next identifies whether the media signal contains metadata identifying the performer and subject matter within the media signal (step 916). The metadata can include information about the media signal, including the subject matter and the identity of the performer of that subject matter. In one illustrative example, metadata can be digital video broadcasting service information (DVB-SI).

Responsive to process 900 not identifying that the media signal contains metadata identifying the performer and subject matter within the media signal ("no" at step 916), process 900 identifies whether the media signal matches a matching reference signal (step 918). When a media signal lacks metadata, a software component, such as media comparison logic 324 of FIG. 3, compares the media signal to a set of reference signals stored in a media library, such as media library 326 of FIG. 3.

Responsive to process 900 identifying that the media signal matches a matches a reference signal ("yes" step 918), process 900 identifies a performer and subject matter associated with the matching reference signal (Step 920). Each reference signal has an associated subject matter and performer. When a media signal is found to match one of the reference signals, then the subject matter and performer associated with the reference signal is utilized as the subject matter and performer of media signal. Process 900 then continues to process step 922.

Retuning now to step 918, responsive to process 900 not identifying that the media signal matches a matches a reference signal ("no" step 918), process 900 identifies the performer and subject matter using statistical classification techniques (step 921). Process 900 then continues to process step 922.

Process 900 then identifies a representative icon from the performer and subject matter (step 922). A software component, such as icon identification logic 328 of FIG. 3, identifies a visual indicator to represent the subject matter and performer for each of the set of received media signals. The software component receives the identified subject matter and performer of the media signal. The software component then identifies a representative icon in an icon library that corresponds to the known subject matter and performer of the media signal.

Responsive to identifying the representative icon, process 900 forwards the set of icons to a client (step 924), with the process terminating thereafter.

Returning now to step 916, if process 900 does identify metadata identifying the performer and subject matter, process 900 proceeds to step 922, to identify a representative icon from the performer and subject matter. Process 900 then proceeds according to the process steps as described above.

Thus, the illustrative embodiments describe a computer implemented method in a data processing system, and a computer program product for visually selecting a media signal. A set of media signals is received from a set of media providers. A subject matter and a performer of the subject matter are then identified for at least one of the set of the media signals. A set of icons is then identified. Each of the set of icons corresponds to at least one of media signals. The set of icons and the set of media providers are then forwarded to a client media player.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, such as, a cable modem and Ethernet cards, are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for selecting a media signal, the method comprising:
    receiving a set of media signals from a set of media providers;
    responsive to receiving the set of media signals from the set of media providers, identifying at least one of a subject matter and a performer of the subject matter for at least one of the set of media signals, wherein the step of identifying the subject matter and the performer of the subject matter for at least one of the set of media signals comprises: extracting a set of features from the at least one of the set of media signals; isolating at least one characteristic from the set of features; comparing the at least one characteristic to at least one of a statistical model of known subject matter and a statistical model of known performers; and identifying similarities between the at least one characteristic to the statistical model of known subject matter and the statistical model of known performers to determine at least one of a probable subject matter and a probable performer, wherein the subject matter is the probable subject matter and the performer is the probable performer;
    responsive to identifying the at least one of the subject matter and the performer, identifying a set of icons, each of the set of icons corresponding to at least one of the subject matter and the performer of the at least one of the set of media signals;
    responsive to identifying the set of icons, forwarding a set of displayed icons and a set of displayed media providers to a client media player, the set of displayed icons being selected from the set of icons, wherein each of the set of displayed media providers corresponds to both one of the set of displayed icons and to one of the set of media providers.

2. The computer implemented method of claim 1, further comprising:
    receiving an indication of a selected icon from the client media player, the selected icon being one of the set of displayed icons; and
    responsive to receiving a selection of the displayed icon, instructing the client media player to play a selected media signal of the set of media signals, the selected media signal corresponding to the selected icon.

3. The computer implemented method of claim 1, further comprising:
    extracting the set of features from the at least one of the set of media signals utilizing a short-time Fourier transformation; and
    identifying similarities between the at least one characteristic to the at least one of the statistical model of known subject matter and the statistical model of known performers to determine the probable subject matter and the probable performer, wherein the similarities are identified using a statistical classification method selected from the group consisting of a K-nearest neighbor, a Gaussian mixture modeling, a support vector machines, a vector quantization, a hidden Markov modeling, a multivariate auto-regression modeling, and combinations thereof.

4. The computer implemented method of claim 1, wherein the set of media providers is a set of preferred media providers, the method further comprising:
    identifying the set of preferred media providers; and
    responsive to identifying the set of icons, forwarding only a set of preferred displayed icons and only a set of preferred displayed media providers to the client media player, the set of preferred displayed icons being selected from the set of icons, wherein each of the set of preferred displayed media providers corresponds to both one of the set of preferred displayed icons and to one of the set of preferred media providers.

5. The computer implemented method of claim 1, wherein the step of identifying the subject matter and the performer of the subject matter for at least one of the set of media signals comprises:
    identifying a metadata for the at least one of the set of media signals, the metadata indicating the subject matter and the performer of the subject matter.

6. The computer implemented method of claim 1, wherein the step of identifying the subject matter and the performer of the subject matter for at least one of the set of media signals comprises:
    comparing the at least one of the set of media signals with a set of exemplary media signals in a media library to determine a matching media signal;
    identifying a matching subject matter and a matching performer of the matching subject matter corresponding to the matching media signal;
    identifying the subject matter as being the matching subject matter and identifying the performer of the subject matter as being the matching performer.

7. The computer implemented method of claim 1, wherein the step of identifying the subject matter and the performer of the subject matter for the at least one of the set of media signals comprises:
    serially identifying and updating the subject matter and the performer of the subject matter for the at least one of the set of media signals.

8. The computer implemented method of claim 1, the method further comprising:
    responsive to receiving a set of media signals from a set of media providers, applying a speech recognition to convert the set of media signals to text; and
    identifying at least one of a subject matter and a performer of the subject matter for at least one of the set of media signals, wherein the subject matter and the performer are identified by applying text analysis and topic detection methods to the text.

9. The computer implemented method of claim 1, the method further comprising:
    identifying at least one of a subject matter and a performer of the subject matter for at least one of the set of media signals by accessing information regarding the media signal from a network informational database.

10. A computer program product comprising:
a non-transitory computer readable medium having a computer usable program code for selecting a media signal, the computer program product comprising:
computer usable program code for receiving a set of media signals from a set of media providers;

computer usable program code, responsive to receiving the set of media signals from the set of media providers, for identifying at least one of a subject matter and a performer of the subject matter for at least one of the set of media signals, wherein the computer usable program code for identifying the subject matter and the performer of the subject matter for at least one of the set of media signals comprises: computer usable program code for extracting a set of features from the at least one of the set of media signals; computer usable program code for isolating at least one characteristic from the set of features; computer usable program code for comparing the at least one characteristic to at least one of a statistical model of known subject matter and a statistical model of known performers; and computer usable program code for identifying similarities between the at least one characteristic to the statistical model of known subject matter and the statistical model of known performers to determine at least one of a probable subject matter and a probable performer, wherein the subject matter is the probable subject matter and the performer is the probable performer;

computer usable program code, responsive to identifying the at least one of the subject matter and the performer, for identifying a set of icons, each of the set of icons corresponding to at least one of the subject matter and the performer of the at least one of the set of media signals;

computer usable program code, responsive to identifying the set of icons, for forwarding a set of displayed icons and a set of displayed media providers to a client media player, the set of displayed icons being selected from the set of icons, wherein each of the set of displayed media providers corresponds to both one of the set of displayed icons and to one of the set of media providers.

11. The computer program product of claim 10, further comprising:
computer usable program code for receiving an indication of a selected icon from the client media player, the selected icon being one of the set of displayed icons; and
computer usable program code, responsive to receiving a selection of the displayed icon, for instructing the client media player to play a selected media signal of the set of media signals, the selected media signal corresponding to the selected icon.

12. The computer program product of claim 1, further comprising:
computer usable program code for extracting the set of features from the at least one of the set of media signals utilizing a short-time Fourier transformation; and
computer usable program code for identifying similarities between the at least one characteristic to the at least one of the statistical model of known subject matter and the statistical model of known performers to determine the probable subject matter and the probable performer, wherein the similarities are identified using a statistical classification method selected from the group consisting of a K-nearest neighbor, a Gaussian mixture modeling, a support vector machines, a vector quantization, a hidden Markov modeling, a multivariate auto-regression modeling, and combinations thereof.

13. The computer program product of claim 10, wherein the computer usable program code for identifying the subject matter and the performer of the subject matter for at least one of the set of media signals comprises:

computer usable program code for identifying a metadata for the at least one of the set of media signals, the metadata indicating the subject matter and the performer of the subject matter.

14. The computer program product of claim 10, wherein the computer usable program code for identifying the subject matter and the performer of the subject matter for at least one of the set of media signals comprises:
computer usable program code for comparing the at least one of the set of media signals with a set of exemplary media signals in a media library to determine a matching media signal;
computer usable program code for identifying a matching subject matter and a matching performer of the matching subject matter corresponding to the matching media signal; and
computer usable program code for identifying the subject matter as being the matching subject matter and identifying the performer of the subject matter as being the matching performer.

15. The computer program product of claim 10, wherein the computer usable program code for identifying the subject matter and the performer of the subject matter for the at least one of the set of media signals comprises:
computer usable program code for serially identifying and updating the subject matter and the performer of the subject matter for the at least one of the set of media signals.

16. The computer program product of claim 10 further comprising:
computer usable program code, responsive to receiving a set of media signals from a set of media providers, for applying a speech recognition to convert the set of media signals to text; and
computer usable program code for identifying at least one of a subject matter and a performer of the subject matter for at least one of the set of media signals, wherein the subject matter and the performer are identified by applying text analysis and topic detection methods to the text.

17. The computer program product of claim 10 further comprising:
computer usable program code for identifying at least one of a subject matter and a performer of the subject matter for at least one of the set of media signals by accessing information regarding the media signal from a network informational database.

18. A data processing system for selecting a media signal, the data processing system comprising:
a bus;
a storage device connected to the bus, wherein the storage device contains a computer usable code; and
a processing unit connected to the bus, wherein the processing unit executes the computer usable program code to receive a set of media signals from a set of media providers, responsive to receiving the set of media signals from the set of media providers, to identify at least one of a subject matter and a performer of the subject matter for at least one of a set of media signals, wherein the processing unit executes the computer usable program code to identify the subject matter and the performer of the subject matter for at least one of the set of media signals comprises the processing unit executes the computer usable program code: to extract a set of features from the at least one of the set of media signals; to isolate at least one characteristic from the set of features; to compare the at least one characteristic to at least one of a statistical model of known subject matter and a statistical model of known performers; and to identify similarities between the at least one characteristic to the statistical model of known subject matter and the statistical model of known performers to determine at least one of a probable subject matter and a probable performer, wherein the subject matter is the probable subject matter and the performer is the probable performer, responsive to identifying the at least one of the subject matter and the performer, to identify a set of icons, each of the set of icons corresponding to at least one of the at least one of the subject matter and the performer of the at least one of the set of media signals, and responsive to identifying the set of icons, to forward a set of displayed icons and a set of displayed media providers to a client media player, the set of displayed icons being selected from the set of icons, wherein each of the set of displayed media providers corresponds to both one of the set of displayed icons and to one of the set of media providers.

19. The data processing system of claim 18, wherein the processing unit further executes the computer usable program code:
to receive an indication of a selected icon from the client media player, the selected icon being one of the set of displayed icons, and responsive to receiving a selection of the displayed icon, to instruct the client media player to play a selected media signal of the set of media signals, the selected media signal corresponding to the selected icon.

20. The data processing system of claim 18, wherein the processing unit further executes the computer usable program code:
to extract the set of features from the at least one of the set of media signals utilizing a short-time Fourier transformation, and to identify similarities between the at least one characteristic to the at least one of the statistical model of known subject matter and the statistical model of known performers to determine the probable subject matter and the probable performer, wherein the similarities are identified using a statistical classification method selected from the group consisting of a K-nearest neighbor, a Gaussian mixture modeling, a support vector machines, a vector quantization, a hidden Markov modeling, a multivariate auto-regression modeling, and combinations thereof.

21. A computer implemented method in a data processing system for selecting a media signal, the method comprising:
receiving a set of displayed icons and a set of displayed media providers;
responsive to receiving the set of displayed icons and the set of displayed media providers, displaying the set of icons and the set of displayed media providers;
receiving an indication of a selected icon, the selected icon being one of the set of displayed icons;
receiving an instruction to play a selected media signal, the selected media signal corresponding to the selected icon; and
playing the selected media signal.

22. The computer implemented method of claim 21, wherein the step of receiving an instruction to play the selected media signal comprises one of:
receiving an instruction to receive the selected media signal directly from a selected media provider; or
receiving an instruction to receive the selected media signal from a visual media service provider.

* * * * *